(12) United States Patent
Freeman et al.

(10) Patent No.: US 6,371,224 B1
(45) Date of Patent: Apr. 16, 2002

(54) THREADED SPACER

(75) Inventors: Stephen Freeman, Beachwood; David Krus, University Heights; Donald Moracz, Independence; William D. Nielsen, Jr., Avon Lake, all of OH (US); Diane Ryan, Kingwood, TX (US)

(73) Assignee: Brush Wellman, Inc., Cleveland, OH (US)

( * ) Notice: Subject to any disclaimer, the term of this patent is extended or adjusted under 35 U.S.C. 154(b) by 0 days.

(21) Appl. No.: 09/522,134

(22) Filed: Mar. 9, 2000

(51) Int. Cl.$^7$ .................... E21B 17/043; E21B 17/046
(52) U.S. Cl. ................ 175/323; 175/325.2; 285/334; 29/437; 29/454; 277/343; 277/603; 277/611; 277/626; 277/638; 277/649
(58) Field of Search .................. 175/320, 323, 175/325.1, 325.2, 57; 166/344, 381; 285/332, 332.4, 333, 334; 29/419.2, 434, 435, 437, 454, 456; 277/343, 602, 603, 608, 611, 626, 627, 629, 637, 638, 649, 650, 653, 940, 941

(56) References Cited

U.S. PATENT DOCUMENTS

| 1,344,028 A | * | 6/1920 | Ewald |
| 1,489,065 A | * | 4/1924 | Clifton |
| 1,543,963 A | * | 6/1925 | Walton |
| 1,840,312 A | * | 1/1932 | Dunmire |
| 2,762,638 A | * | 9/1956 | Brown |
| 2,766,054 A | * | 10/1956 | Everhart |
| 3,208,757 A | * | 9/1965 | Jageman |
| 4,647,072 A | * | 3/1987 | Westman |
| 5,485,870 A | * | 1/1996 | Kraik |
| 5,637,806 A | * | 6/1997 | Baryshnikov et al. |

FOREIGN PATENT DOCUMENTS

IT  980421  7/1996

* cited by examiner

*Primary Examiner*—Roger Schoeppel
(74) *Attorney, Agent, or Firm*—Calfee, Halter & Griswold, LLP

(57) ABSTRACT

An improved thin walled threaded spacer for use in preventing thread galling in adjacent sections of drill pipe in a drill string is formed by mechanically deforming a strip of copper/beryllium alloy containing 2% beryllium to form a preform having a hollow, truncated conical section and then mechanically deforming the conical section to impart helical grooves therein.

33 Claims, 4 Drawing Sheets

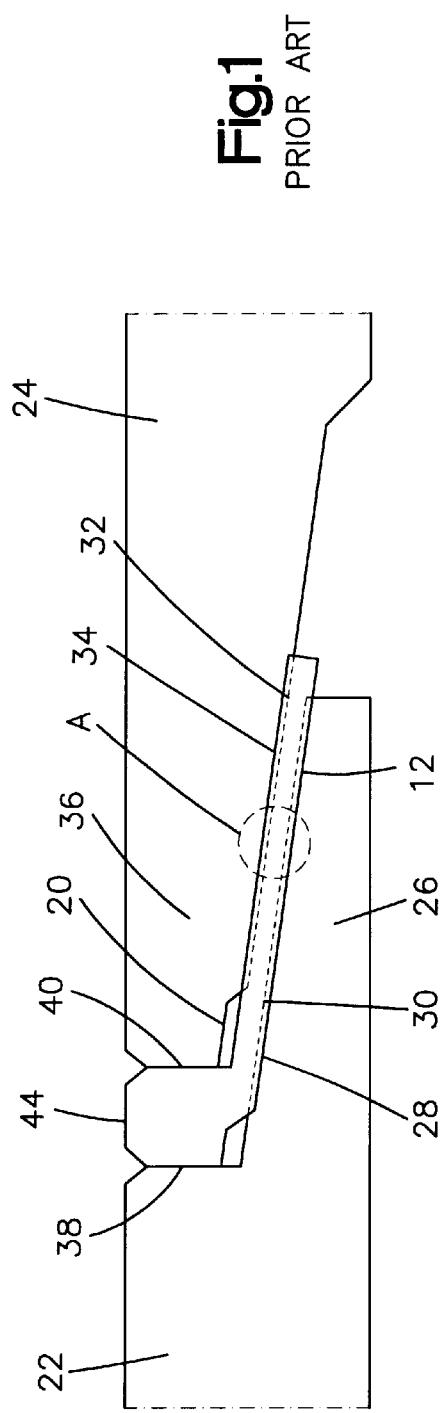
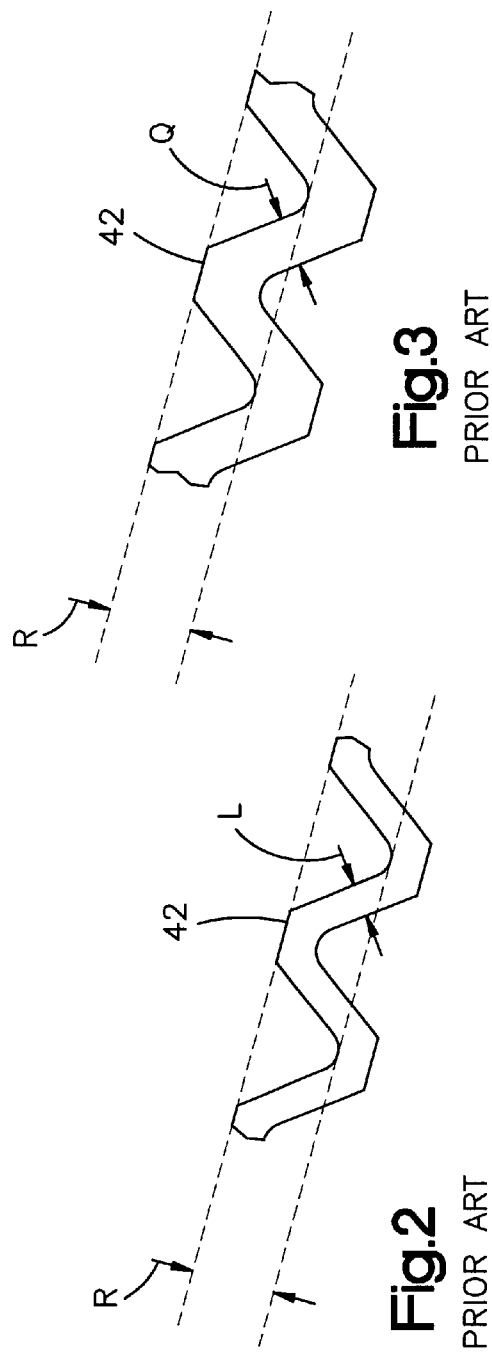
Fig.1 PRIOR ART
Fig.2 PRIOR ART
Fig.3 PRIOR ART

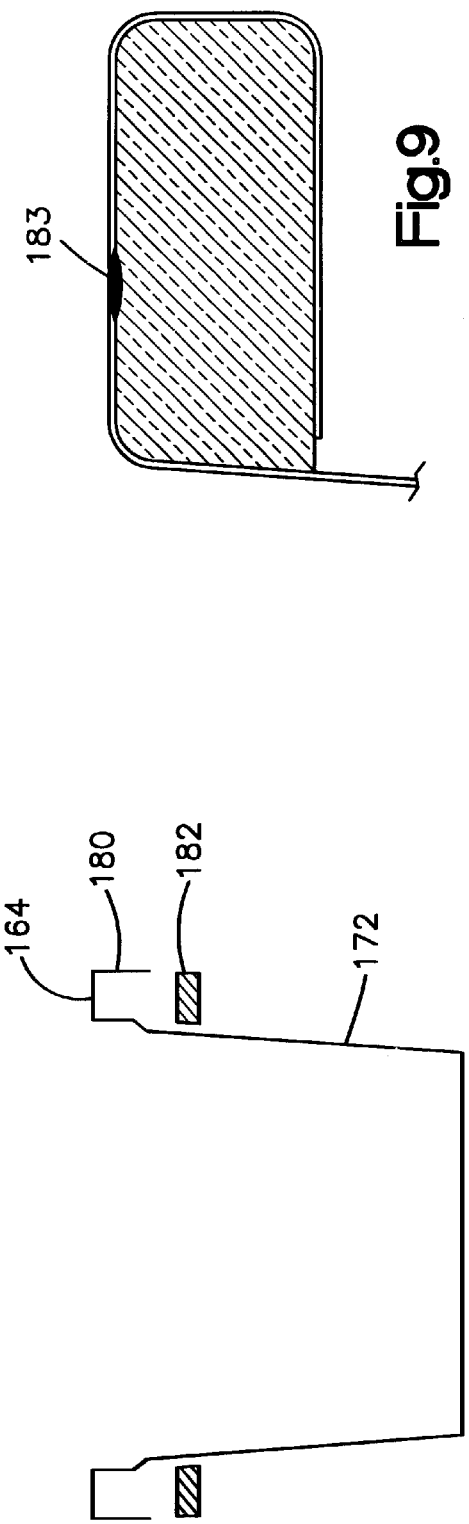

THREADED SPACER

BACKGROUND OF THE INVENTION

The present invention relates to improved threaded spacers for use in joining adjacent sections of drill pipe in a drill string for recovering oil or gas from a subterranean formation, as well as an improved method for making such threaded spacers.

In order to prevent thread galling and to provide joint security in connection with the joining and use of drill pipe used in oil and gas recovery, the threads of the pipe are typically coated with a suitable thread compound. These compounds usually contain finely divided metal powder such as zinc or lead and sometimes other ingredients such as active sulfur. Experience has shown that these compounds may degrade over time, or under the influence of the extreme conditions encountered in use, leading to loss of their anti-galling properties. Furthermore, many of these compounds are now classified as hazardous substances because of their high metal particle content.

In order to eliminate these problems, Italian Patent 980421 to Baryshnikov et al. describes a threaded spacer which is intended to replace conventional thread compounds. The particular threaded spacer disclosed is composed of a conical section having a flange at its open, larger end. Cooperating helical grooves are formed in the inside and outside surfaces of the conical section wall such that the conical wall, as a whole, is undulating in cross section. The flange, which is arranged perpendicular to the axis of the conical section, is made about 8 to 16 times as thick as the conical section wall. With this structure, the conical section of the spacer can be received between mating grooves of adjacent drill pipe sections, while the flange will fill the annular space defined between the shoulders of adjacent pipe sections.

The threaded spacer of Italian Patent 980421 is described as being made from copper/beryllium alloy. This alloy has a unique combination of properties, including wear and galling resistance, when mated with steel and other metals. It is therefore claimed that this device can totally replace conventional thread compounds, thereby eliminating the environmental and performance problems associated with these compounds.

Unfortunately, Italian patent 980421 appears to be a conceptual disclosure only. No method of manufacture is disclosed. Nor is the description of wall thicknesses clear.

Other devices for use in drill strings, such as drill collars, drill bit bushings, centralizers, shock collars, directional tools, and "subs" (couplers for attaching drill bits to drill strings), are currently made from copper/beryllium alloy. These devices are typically made by machining, i.e. operations in which a portion of the work piece is removed by cutting, drilling or like operation. Accordingly, it appears possible that the threaded spacers of Italian Patent 980421 can be made by machining as well. However, machining is inherently expensive, especially when a complex part is made from an expensive material such as copper/beryllium alloy. Furthermore, it is difficult to make parts having extremely thin wall sections by machining operations.

Accordingly, there is a need for a new method of making threaded spacers of the type shown in Italian Patent 980421, which avoids or at least minimizes machining steps in forming the basic part structure. In addition, there is also a need to develop threaded spacers having thinner wall sections and thicker wall sections than contemplated in that patent.

SUMMARY OF THE INVENTION

In accordance with the present invention, a new process is provided for making threaded spacers of the type shown in Italian Patent 980421. In this process, a strip or sheet of metal is mechanically deformed in a first forming step to produce a preform having the gross shape of the desired threaded spaced product including a thin-walled conical section and an integral flange. Then, in a second forming step, the preform is mechanically deformed again to impart helical grooves and an undulating cross-section shape to the thin walled conical section of the preform, thereby producing the desired threaded spacer product.

In both forming steps, forming is accomplished by mechanical deformation without machining. Therefore, the desired threaded spacer product can be formed easily and inexpensively and hence at a cost which makes its use economically feasible. Furthermore, threaded spacer products having much smaller wall thicknesses than possible in the past can be made using this approach. This further contributes to a reduction in manufacturing cost, because the amount of expensive beryllium/copper alloy used is greatly reduced.

Thus, the present invention in one embodiment provides a novel process for making a thin walled threaded spacer for use in joining adjacent sections of drill pipe, the spacer having a hollow conical section and an integral spacer flange, the wall thickness of the hollow conical section being about 0.5 mm or less with the spacer flange being about 5 to 40 times as thick as the conical section wall thickness, the spacer conical section defining cooperating helical threads for mating with the threads of adjacent sections of drill pipe, wherein the process comprises mechanically deforming a strip of metal to form a preform defining a preform conical section and an integral preform flange in a first process step and then further mechanically deforming the spacer conical section to impart helical threads on its inside and outside faces, thereby forming the desired threaded spacer product.

In another embodiment, the present invention also provides an improved thin walled threaded spacer for use in joining adjacent sections of drill pipe having helically-threaded male ends and helically-threaded female ends, the inventive spacer being formed from a copper/beryllium alloy and having a hollow conical section defined by a conical wall having an inside face and an outside face, the thickness of the conical wall being between about 0.5 mm or less, the hollow conical section defining a smaller open end and a larger open end opposite the smaller open end, the spacer also defining a flange integral with the spacer conical wall at its larger end, the thickness of the flange being about 5 to 40 times the thickness of the conical wall, the inside face and the outside face of the spacer conical section each defining cooperating helical grooves such that the spacer conical wall is undulating in cross-section whereby the spacer conical wall can be received by mating helical threads of adjacent sections of drill pipe.

BRIEF DESCRIPTION OF THE DRAWINGS

The present invention may be more readily understood by reference to the following drawings wherein:

FIG. 1 is a schematic cross sectional view of the threaded spacer of Italian Patent 980421 being inserted between the threads of two joined sections of drill pipe in a drill string;

FIG. 2 is an enlarged cross sectional view of the portion of the threaded spacer of FIG. 1 within circle A;

FIG. 3 is a view similar to FIG. 2 illustrating an alternate embodiment of the threaded spacer of Italian Patent 980421;

FIGS. 7, 8 and 9 are cross sectional views similar to FIGS. 1 to 5 illustrating an alternate embodiment of the invention.

DETAILED DESCRIPTION

Figure 4:
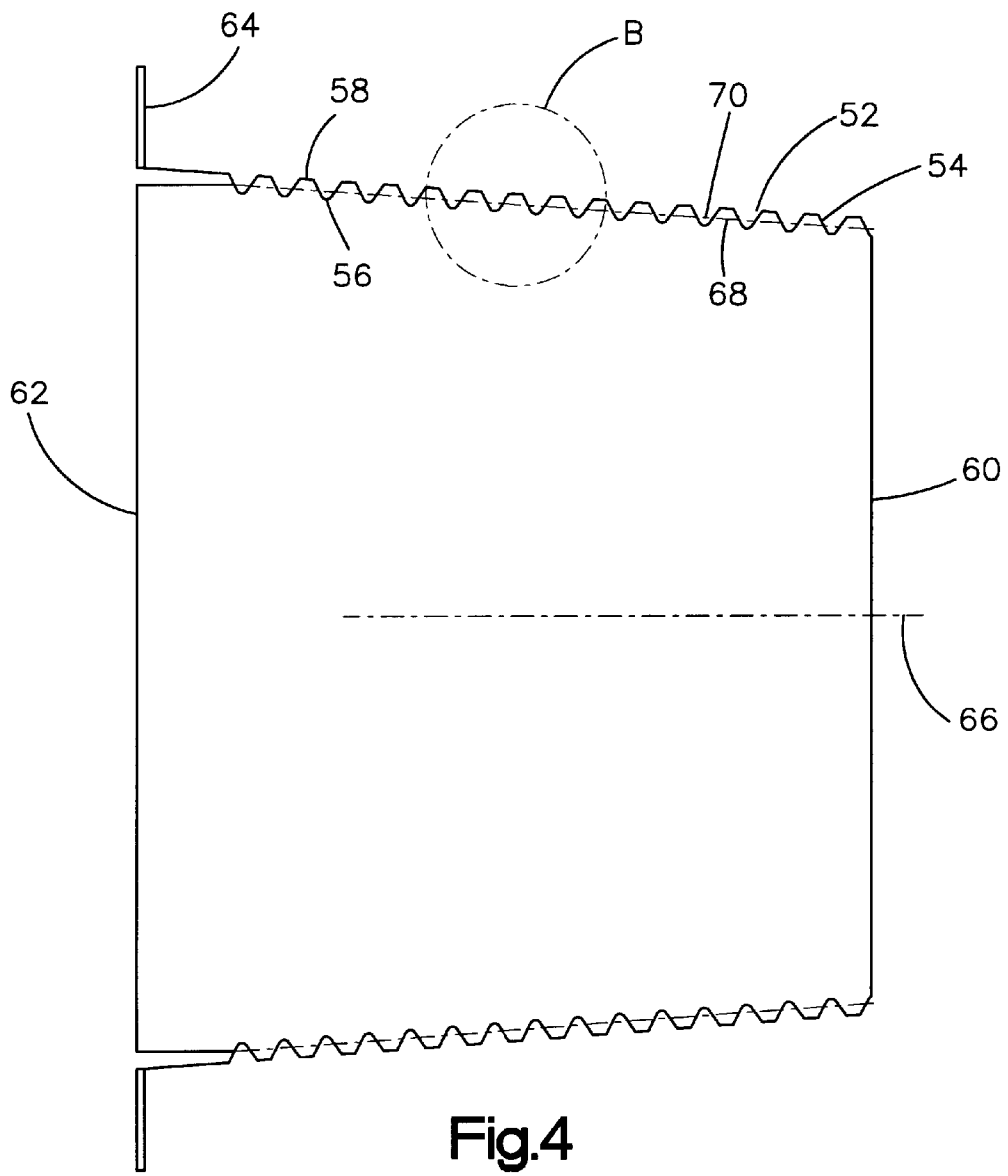
FIG. 4 is a schematic cross sectional view of the threaded spacer of the present invention.

FIG. 1 illustrates the threaded spacer 20 of Italian Patent No. 980421 shown being inserted between the threads of two joined sections of drill pipe 22 and 24 in a drill string. Drill pipe section 22 includes a male or "pin" portion 26 defining a conical face 28 which, in turn, defines a helical thread/groove 30 therein. Similarly, drill pipe section 24 includes a female or "box" portion 36 defining helical thread/groove 32 therein intended to mate with helical thread/groove 30 of drill pipe section 22. Drill pipe section 22 defines a shoulder 38 which is adapted to face and mate with shoulder 40 of drill pipe section 24.

As shown in FIG. 1, the threaded spacer of Italian Patent No. 980421 is inserted between drill pipe sections 22 and 24. Threaded spacer 20 includes a truncated conical section 42 which is received between cooperating helical thread/grooves 30 and 32 in drill pipe sections 22 and 24 and a flange 44 received between shoulders 38 and 40 of the drill pipe sections.

In order that truncated conical section 42 of threaded spacer 20 can be received between mating helical thread/grooves 30 and 32 of drill pipe sections 22 and 24, respectively, the wall forming truncated conical section 42 is actually undulating in cross-section. This is shown in FIGS. 2 and 3, which are reproductions of two figures in the Italian patent showing detailed views of the portion of truncated conical section 42 within circle A of FIG. 1. Two different embodiments with different wall thicknesses are illustrated in FIGS. 2 and 3.

Italian Patent 980,421 is vague with respect to the wall thickness of truncated conical section 42. There is some indication, however, that this thickness may be about 1 to 2 mm. The groove depth of typical drill pipe having outside diameters of 6 to 8 inches is on the order of 3 to 5 mm. FIGS. 2 and 3 herein, which essentially reproduce figures in the Italian patent, show that the wall thicknesses, L and Q, are roughly ⅓ to ⅔ as thick as the groove depth R. This translates to wall thicknesses L and Q that can range on the order from about 1 to 3 mm.

In accordance with the present invention, a novel threaded spacer of the type illustrated in Italian Patent 980421 is made by a new process in which a metal strip is mechanically deformed to form a preform and the preform then further mechanically deformed to impart appropriate grooving thereto.

Figure 5:
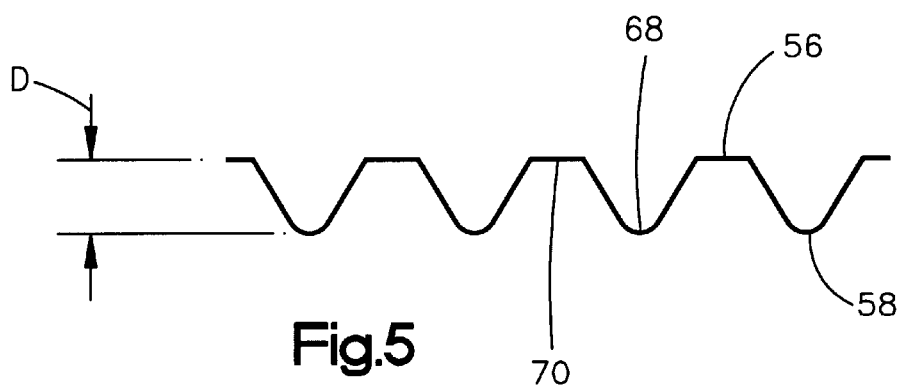
FIG. 5 is an enlarged cross sectional view of the portion of the threaded spacer of FIG. 4 within circle B.

The novel thin walled threaded spacer produced by this process is illustrated in FIGS. 4 and 5 generally at 50. It is composed of a hollow, truncated, conical section 52 formed by conical wall 54 defining an inside face 56 and an outside face 58. A smaller open end 60 is defined on one side of conical section 52, while a larger open end 62 is defined on the opposite end of conical section 52. Integral with conical wall 54 on the larger end of conical section 52 is flange 64, which is arranged in a plane perpendicular to the axis 66 of conical section 52.

As illustrated in FIG. 5, the inside face 56 and outside face 58 of conical wall 54 define cooperating grooves 68 and 70, respectively, for receiving mating threads of adjacent sections of drill pipe to be joined. As in the case of Italian Patent 980421, the wall thickness of the portion of conical wall 54 defining grooves 68 and 70 is thin enough so that this conical wall is actually undulating in cross section, as shown in both FIGS. 4 and 5. However, in the case of the inventive threaded spacer, the thickness of conical wall 54 is considerably thinner, typically on the order of 0.5 mm or less, preferably 0.4 mm or less, more preferably about 0.3 mm or less. Thus, in the inventive threaded spacer, the thickness of the portion of conical wall 54 defining grooves 68 and 70 is typically about 20% or less, preferably about 10% or less, even 5% or less, than the depth of grooves 68 and 70, shown as distance D in FIG. 5.

Flange 64 of the inventive threaded spacer can be any thickness necessary to fill, substantially completely, the annular space formed between the shoulders of adjacent drill pipe sections when joined together with the inventive threaded spacer. See FIG. 1. This depends on a number of factors including the shoulder design of the drill pipe, the angle of conical wall 54 with respect to axis 66 and the thickness of conical wall 54. In general, flange 64 will be about 5 to 40, preferably 15 to 30, more preferably 20 to 25, times as thick as the wall thickness of conical wall 54.

In the particular embodiment shown in FIGS. 4 and 5, conical wall 54 has a wall thickness of about 0.012 inches (about 0.3 mm), which represents about 9% of the depth of grooves 68 and 70. Similarly, flange 64 in the particular embodiment shown is about 0.30 inches (about 7.2 mm) thick, or about 25 times as thick as the wall thickness of conical wall 54.

The inventive threaded spacer has a thin wall in its conical section in order to avoid development of damaging stress levels in the drill pipe thread. This means that the conical section need only be thick enough to remain physically intact during joining and use of the drill pipe for recovery or oil or gas. Certain specific alloys exhibit a unique combination of properties, including high electrical conductivity, high strength, corrosion resistance, formability, low coefficient of sliding friction and resistance to wear and resistance to galling when mated with steel or other ferrous or non-ferrous metal. These alloys make ideal candidates for making the inventive threaded spacer, since they not only provide the desired lubricating and anti-galling effects on a long life basis but also are relatively easy to form into thin shapes by mechanical or electromechanical deformation without machining.

Figure 6:
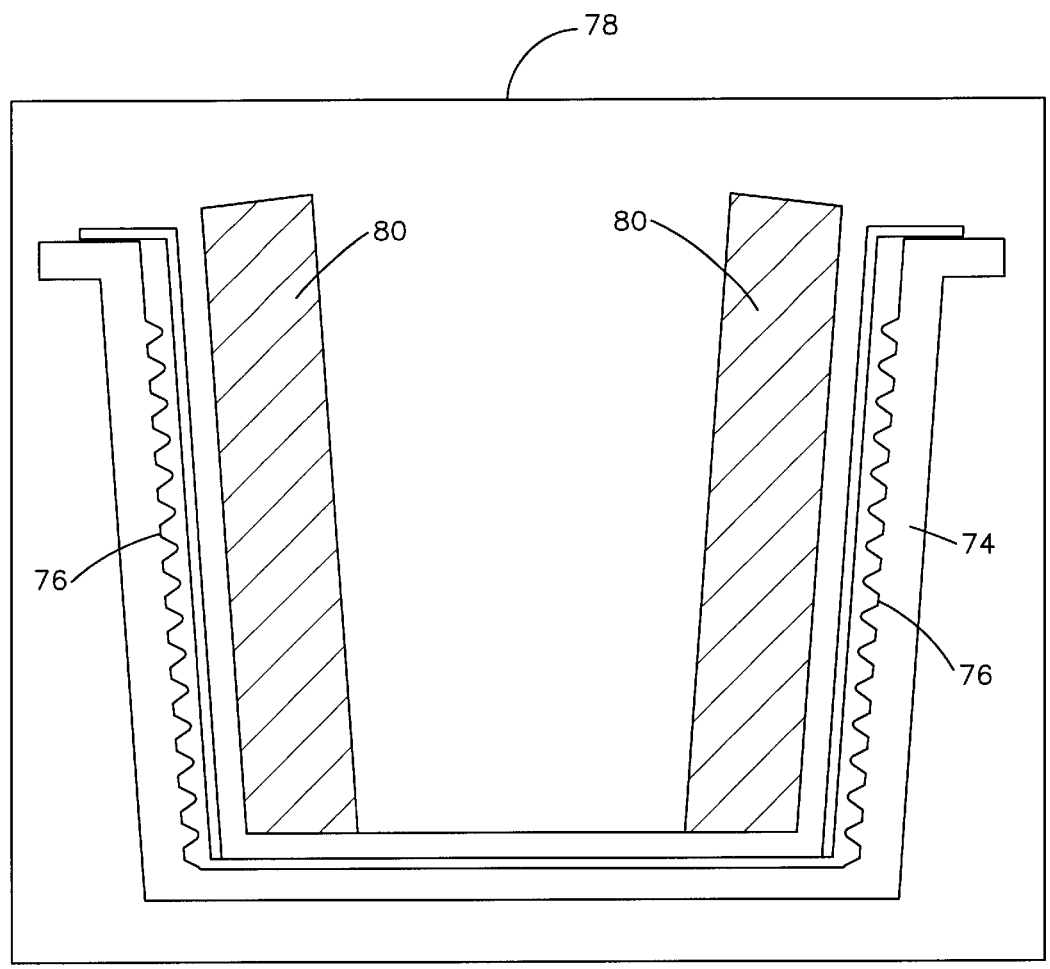
FIG. 6 is a schematic cross sectional view illustrating the inventive process for making the inventive threaded spacer of FIG. 4.

Examples of such alloys are copper/beryllium alloys containing at least about 0.1 wt. % to 10 wt. % or more beryllium, preferably at about 0.75 to 5 wt. % beryllium, more preferably about 1.25 to 3 wt. % beryllium. A most preferred copper/beryllium alloy contains about 2 to 2.5 weight percent beryllium. Such alloys can contain other additional ingredients which do not fundamentally alter their basic properties. Examples are Ni, Co, Zr, Ti, Hf, Sn, Pb, Ag, Mg, Si, Al and Cr. Exemplary alloys are described, for example, in U.S. Pat. Nos. 5,993,574, 4,179,314, 4,551,187 and 4,657,601, the disclosures particular threaded spacer illustrated in FIG. 4 and 6 is made from copper/beryllium alloy containing 2 weight % of beryllium.

Other alloys useful in making the inventive threaded spacer by means of the inventive process are those composed predominantly of Cu, Ni or Al alloyed with one or more of Sn, Zn, Zr, Pb, Ti, Si, Al, Cr, Mg, Ni, Cu, In and Bi.

Specific examples are alloys of Cu/Sn, Cu/Ni, Cu/Ni/Sn, Cu/Zn, Cu/Si, Ni/Cr, Cu/Al, Al/Ti, Al/Mg and Al/Zn. An alloy containing about 5 to 9% Sn and 7 to 16% Ni, with the balance being Cu, especially one containing about 8% Sn and about 15% Ni, show a particularly beneficial coefficient of friction with respect to drill pipe steel in the absence of additional lubrication. See U.S. patent application Ser. No. 08/552,582, filed Nov. 3, 1995, the disclosure of which is incorporated herein by reference.

The inventive threaded spacer can be made from less expensive materials as well, although useful life, anti-galling effect and/or ease of formation may be adversely affected.

The inventive threaded spacer is made by a process based mechanical deformation of a metal strip. By "strip" is meant any sheet or strip of metal having an essentially uniform thickness over an area many times longer and wider than its thickness. A strip is therefore distinguished from a rod, bar or ingot, whose length and/or width may be similar to its thickness.

By mechanical deformation is meant a process in which the shape is imparted to a workpiece by the application of mechanical force without removal of material from the workpiece by machining or other cutting operation. Many different mechanical deformation processes are known and can be used in the inventive process. Examples are cold forming, deep drawing, wall ironing, spin forming, thread rolling, semi-molten forming, hydroforming, warm forging, hot forging, cold forging, magneforming, thixoforging and explosive forming. Preferred mechanical deformation processes for use in the inventive process are magneforming and thixoforging.

In carrying out the inventive process, some of the forming operation can be accomplished by machining. However, machining is expensive both in terms of procedure as well as through waste of material forming the workpiece. Therefore, machining should be avoided as much as possible. Preferably, a majority and indeed substantially all shaping is done in accordance with the inventive process by mechanical or electromechanical deformation only.

In the first step of the inventive process, a preform is produced from a metal strip by mechanical deformation. Preferably, this preform will have a size and shape approaching the gross size and shape of the ultimate threaded spacer product to be produced including a flange and truncated conical section, but without grooving in the conical section. This step is most conveniently done by forming a metal strip over a conical die or form similar in shape, but slightly smaller in outside dimension than, conical wall 54 of the product threaded spacer. Forming the truncated tip of the preform can be accomplished either as part of the formation step or by forming a closed-ended conical tip first and then removing the tip to achieve a truncated end.

The metal strip used in making the preform will preferably have a thickness at least equal to, and preferably larger than, the thickness of flange 64 of the ultimate threaded spacer product in order to simplify formation of flange 64. Indeed, it is desirable in this embodiment of the invention that the inventive threaded spacer be formed from a single, unitary piece of starting material, and therefore the metal strip should be thick enough to allow all of the necessary metal working operations to be done without the need for adding additional material thereto.

During formation of the preform, the portion of metal strip forming conical wall 54 of the product threaded spacer is preferably drawn or stretched as well as worked so that the wall thickness of the preform conical section is substantially the same as the wall thickness of conical wall 54 in the product threaded spacer. Typically, this means that the wall thickness of the metal strip will be reduced by a factor at least equal to the thickness ratio between flange 64 and conical wall 54 in the product threaded spacer. Generally, this ratio can range from 5/1 to 40/1, preferably 15/1 to 30/1, more preferably 20/1 to 25/1. Where the metal strip is reduced in thickness in making flange 64, the thickness of the metal strip defining the preform conical section will be reduced even more.

After formation of the preform, grooves 68 and 70 are formed in the preform conical section. This can be done by any known mechanical deformation technique which will impart grooves 68 and 70, and hence the undulating wall structure illustrated in FIG. 5., to the truncated conical section of the preform. Examples of suitable mechanical deformation techniques for this step are wall ironing, spin forming, thread rolling, die forging, hydroforming, magneforming and thixoforging. Especially preferred are magneforming and thixoforging.

In this connection, FIG. 6 illustrates a preferred embodiment of the inventive process in which the second step of the inventive process is accomplished by vacuum magneforming. In this figure, preform 72 is placed within a die 74 having a grooved surface 76 whose grooves correspond to the size and shape of grooves 68 and 70 to be formed in conical wall 54 of the product threaded spacer. Die 74 is housed in container 78, which is adapted to be closed to the atmosphere. A vacuum system (not shown) is connected to container 78, so that the container interior can be evacuated to a convenient vacuum on the order of $3 \times 10^3$ to $7 \times 10^3$, preferably $4 \times 10^3$ to $5 \times 10^3$, Torr. Although this vacuum is unnecessary, it is helpful in improving the definition of the grooves by removing air that may be trapped during the maneforming step. A coil 80, connected to a source capable of generating a large electrical pulse (not shown), is provided in the hollow portion inside the truncated conical section of preform 72.

After container 78 is evacuated, a large electrical pulse is delivered to coil 80. In accordance with known magneforming techniques, this thrusts the conical wall of preform onto grooved surface 76 of die 74 by a force large enough to permanently deform the preform. As a result, the undulating shape of conical wall 54 of the product threaded spacer defined by cooperating grooves 68 and 70 is permanently imparted to the preform. Furthermore, the final wall thickness of conical wall 54 is achieved owing to the slight radial expansion of the preform conical section during this forming step.

After the final, desired shape is imparted to the metal strip workpiece in accordance with the inventive process, it may be necessary or desirable to subject the product obtained to thermal processing to permanently fix the shape and impart the desired material properties in the article. This depends primarily on the alloy used. Also, the conditions for such treatment can be easily determined according to known principles by routine experimentation.

In a second embodiment of the present invention, which is illustrated in FIGS. 7, 8 and 9, the inventive threaded spacer is formed from separate parts which are joined together preferably in the second mechanical deformation step and which may thereafter also be additionally joined together by spot welding at various locations around the surface of its annular flange. As shown in FIG. 7, a preform section 172 is made in a similar manner as preform 72 of FIG. 6, except that annular flange 164 has the same wall thickness as the remainder of the preform. In addition, annular flange 164 is larger radially than flange 64 of the previously described embodiment, with the outer end of this flange being bent downwardly by 90° to form vertical extension 180. Annular ring 182 is inserted in the hollow formed between extension 180, flange 164 and the wall of the preform, as illustrated in FIG. 7, and securely fixed in place by bending the outer (lower) end of extension 180 around the annular ring in the manner illustrated in FIG. 9. As a further measure to securely fix the annular ring, a spot weld zone 183 may be used to join the preform and the annular ring. The advantage of this approach is that it eliminates the stretching, drawing or like mechanical working step needed to reduce the thickness of the preform conical wall in the previous embodiment.

According to the present invention, threaded spacers for drill pipe are made by a forming process using metal strip as the starting material and using mechanical deformation working techniques for the forming steps. With this approach, threaded spacers can be made using less expensive metal forming techniques to produce product spacers significantly thinner than contemplated in the past. As a result, threaded spacers based on expensive alloys such as copper/beryllium or Cu/Ni/Sn can be made at significantly lower cost than possible by the approaches previously suggested. Ultimately, this allows use of threaded spacers as suggested in Italian Patent 980421 to be transformed from an impractical, theoretical idea to practical reality.

Although only a few embodiments of the present invention have been described above, it should be appreciated that many modifications can be made without departing from the spirit and scope of the invention. All such modifications are intended to be included within the scope of the present invention, which is to be limited only by the following claims:

We claim:

1. A process for forming a metal article having a predetermined shape and including a hollow section with an outside surface defining a helical groove therein, the metal article further having a second section integral with the preform hollow section, the second section having a wall thickness thicker than the wall thickness of the hollow section, wherein the process comprises, mechanically deforming a metal strip to form a preform having the predetermined shape including a preform hollow section, the preform hollow section not defining the helical groove, and mechanically deforming the preform hollow section to impart the helical groove therein.

2. The process of claim 1, wherein the metal article is a thin walled threaded spacer for use in joining adjacent sections of drill pipe having helically-threaded male ends and helically-threaded female ends, the spacer having a hollow conical section defined by a conical wall having an inside face and an outside face, the hollow conical section defining a smaller open end and a larger open end opposite the smaller open end, the spacer also defining a flange integral with the spacer conical wall at its larger end, the thickness of the flange being about 5 to 40 times as thick as the thickness of the conical wall, the inside face and the outside face of the spacer conical section each defining a helical groove for mating with the helical threads of adjacent sections of drill pipe.

3. The process of claim 2, wherein the thickness of the conical wall is 0.5 mm or less.

4. The process of claim 3, wherein the thickness of the strip is greater than the thickness of the flange.

5. The process of claim 4, wherein the strip is formed into the preform by cold forming, deep drawing, wall ironing, spin forming, semi-molten forming, hydroforming, warm forging, hot forging, cold forging, magneforming, thixoforging or explosive forming.

6. The process of claim 5, wherein the strip is formed into the preform by magneforming, thixoforging or explosive forming.

7. The process of claim 4, wherein the helical grooves are formed by cold forming, deep drawing, wall ironing, spin forming, thread rolling, semi-molten forming, die forging, thixoforging or magneforming.

8. The process of claim 7, wherein the helical grooves are formed by magneforming.

9. The process of claim 4, wherein the strip is formed from an alloy of copper and beryllium containing at least about 0.1 to 10 weight percent beryllium.

10. The process of claim 9, wherein the alloy contains about 1.25 to 3 weight percent beryllium.

11. The process of claim 1, wherein at least a portion of the forming operation done to transform the metal strip into the metal spacer is done by machining.

12. A process for forming a shaped article comprising mechanically deforming a preform in the shape of a hollow, truncated cone to impart cooperating helical grooves in the inside and outside faces of the cone whereby the wall defining the cooperating helical grooves is undulating in cross-section.

13. The process of claim 12, wherein the wall thickness of the portion of the preform defining the hollow, truncated cone is substantially uniform, whereby the thickness of the undulating wall in the shaped article is substantially uniform.

14. The process of claim 13, wherein the thickness of the undulating wall in the shaped article is substantially the same as the wall thickness of the preform hollow truncated cone.

15. The process of claim 12, wherein the shaped article is a threaded spacer for insertion between the mating threads of two sections of drill pipe for use in forming a drill string for oil or gas recovery, the drill pipe sections having helically-threaded female ends and helically-threaded male ends for joining adjacent pipe sections together, the undulating wall of the threaded spacer being sized and shaped to be received between the mating threads of a pair of joined drill pipe sections.

16. The process of claim 15, wherein the shaped article is made from an alloy of copper and beryllium containing at least about 0.1 weight % beryllium.

17. The process of claim 16, wherein the alloy contains about 1.25 to 3 weight % beryllium.

18. The process of claim 16, wherein the truncated cone of the threaded spacer defines a larger open end and a smaller open end opposite thereto, the threaded spacer farther including a flange integral with the conical wall at the larger open end, the flange having a wall thickness about 5 to 40 times greater than the thickness of the undulating wall, the process further comprising mechanically deforming a strip of metal whose thickness is the same or greater than the thickness of the flange to form of the preform, the preform having a truncated, conical section with substantially the same shape and wall thickness as the hollow, truncated cone of the threaded spacer.

19. The process of claim 12, wherein the preform is mechanically deformed by magneforming or thixoforging.

20. An improved thin walled threaded spacer for use in joining adjacent sections of drill pipe having helically-threaded male ends and helically-threaded female ends, the spacer being formed from an alloy selected from the group consisting of Cu/Be, Cu/Sn, Cu/Ni, Cu/Ni/Sn, Cu/Zn, Cu/Si, Ni/Cr, Cu/Al, Al/Ti, Al/Mg and Al/Zn and having a hollow conical section defined by a conical wall having an inside face and an outside face, the thickness of the conical wall being between about 0.5 mm or less, the hollow conical section defining a smaller open end and a larger open end opposite the smaller open end, the spacer also defining a flange integral with the spacer conical wall at its larger end, the thickness of the flange being about 5 to 40 times the thickness of the conical wall, the inside face and the outside face of the spacer conical section each defining cooperating helical grooves such that the spacer conical wall is undulating in cross-section whereby the spacer conical wall can be received by mating helical threads of adjacent sections of drill pipe, wherein the depth of the helical grooves is at least about 5 times the thickness of the conical wall.

21. A process for forming a threaded spacer for insertion between the mating threads of two sections of drill pipe for use in forming a drill string for oil or gas recovery, the drill pipe sections having helically-threaded female ends and helically-threaded male ends for joining adjacent pipe sections together, the threaded spacer having a conical section and an attached spacer flange, the conical section defining an undulating wall sized and shaped to be received between the mating threads of a pair of joined drill pipe sections, the thickness of the flange being at least five times the thickness of the undulating wall, wherein the process comprises mechanically deforming a preform having a hollow, truncated cone section and an attached annular preform flange of the same thickness as the cone section to impart an undulating shape to the wall of the cone section, and forming the spacer flange of the threaded spacer by attaching an annular ring to the annular preform flange.

22. The process of claim 21, wherein the annular ring is attached to the annular preform flange by bending the preform flange around the annular ring.

23. The process of claim 21, wherein the preform is made by mechanically deforming a metal strip.

24. The process of claim 21, wherein the annular ring is attached to the annular preform flange by spot welding.

25. An improved thin walled threaded spacer for use in joining adjacent sections of drill pipe having helically-threaded male ends and helically-threaded female ends, the spacer being formed from an alloy selected from the group consisting of Cu/Be, Cu/Sn, Cu/Ni, Cu/Ni/Sn, Cu/Zn, Cu/Si, Ni/Cr, Cu/Al, Al/Ti, Al/Mg and Al/Zn and having a hollow conical section defined by a conical wall having an inside face and an outside face, the thickness of the conical wall being between about 0.5 mm or less, the hollow conical section defining a smaller open end and a larger open end opposite the smaller open end, the spacer also defining a flange integral with the spacer conical wall at its larger end, the thickness of the flange being about 5 to 40 times the thickness of the conical wall, the inside face and the outside face of the spacer conical section each defining cooperating helical grooves such that the spacer conical wall is undulating in cross-section whereby the spacer conical wall can be received by mating helical threads of adjacent sections of drill pipe.

26. The threaded spacer of claim 25, wherein the conical wall is about 0.4 mm or less in thickness.

27. The threaded spacer of claim 26, wherein the conical wall is about 0.3 mm or less in thickness.

28. The threaded spacer of claim 25, wherein the thickness of the conical wall is about 20% of the depth of the helical grooves.

29. The threaded spacer of claim 28, wherein the thickness of the conical wall is about 10% of the depth of the helical grooves.

30. The threaded spacer of claim 29, wherein the thickness of the conical wall is about 5% of the depth of the helical grooves.

31. The threaded spacer of claim 29, wherein the conical wall is about 0.4 mm or less in thickness.

32. The threaded spacer of claim 31, wherein the threaded spacer is formed from a single, unitary piece of metal.

33. The threaded spacer of claim 25, wherein the threaded spacer is formed from a single, unitary piece of metal.

* * * * *